INVENTORS.
CLARENCE G. HILLEGONDS
and WILLIAM BRUCE PESTER
BY

David M. Keay

AGENT.

April 27, 1965  C. G. HILLEGONDS ETAL  3,180,212
SLIDE PROJECTOR WITH MOVABLE GATE FOR EDITING PURPOSES
Filed Nov. 6, 1961  7 Sheets-Sheet 2
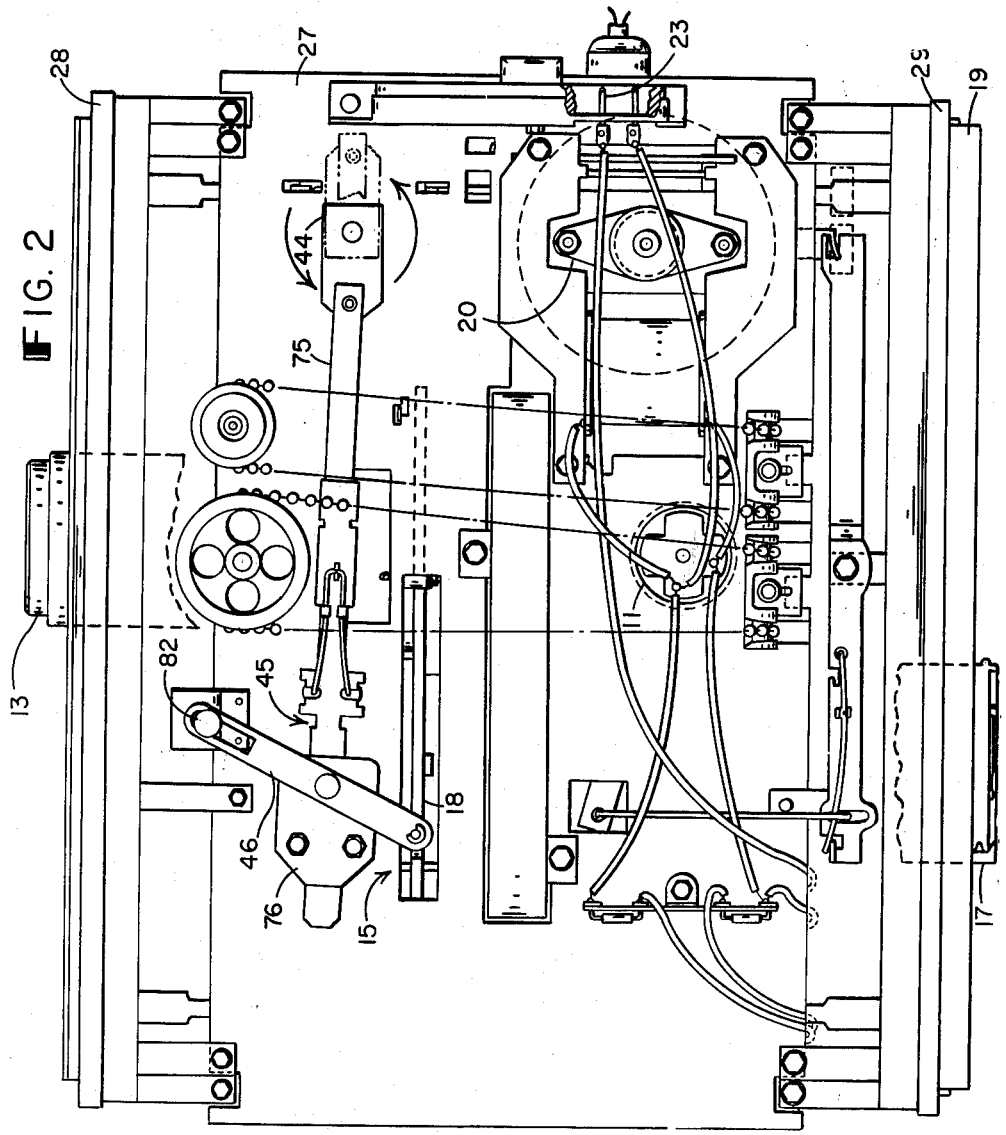
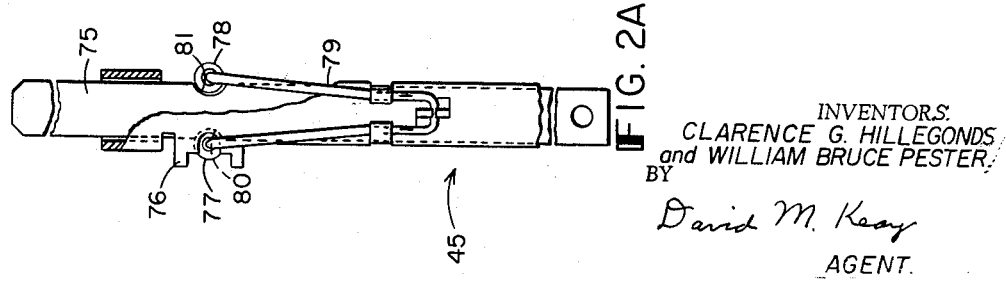
INVENTORS:
CLARENCE G. HILLEGONDS
and WILLIAM BRUCE PESTER.
BY
David M. Keay
AGENT.

April 27, 1965  C. G. HILLEGONDS ETAL  3,180,212
SLIDE PROJECTOR WITH MOVABLE GATE FOR EDITING PURPOSES
Filed Nov. 6, 1961                                    7 Sheets-Sheet 3

INVENTORS.
CLARENCE G. HILLEGONDS
and WILLIAM BRUCE PESTER
BY
David M. Keay
AGENT.

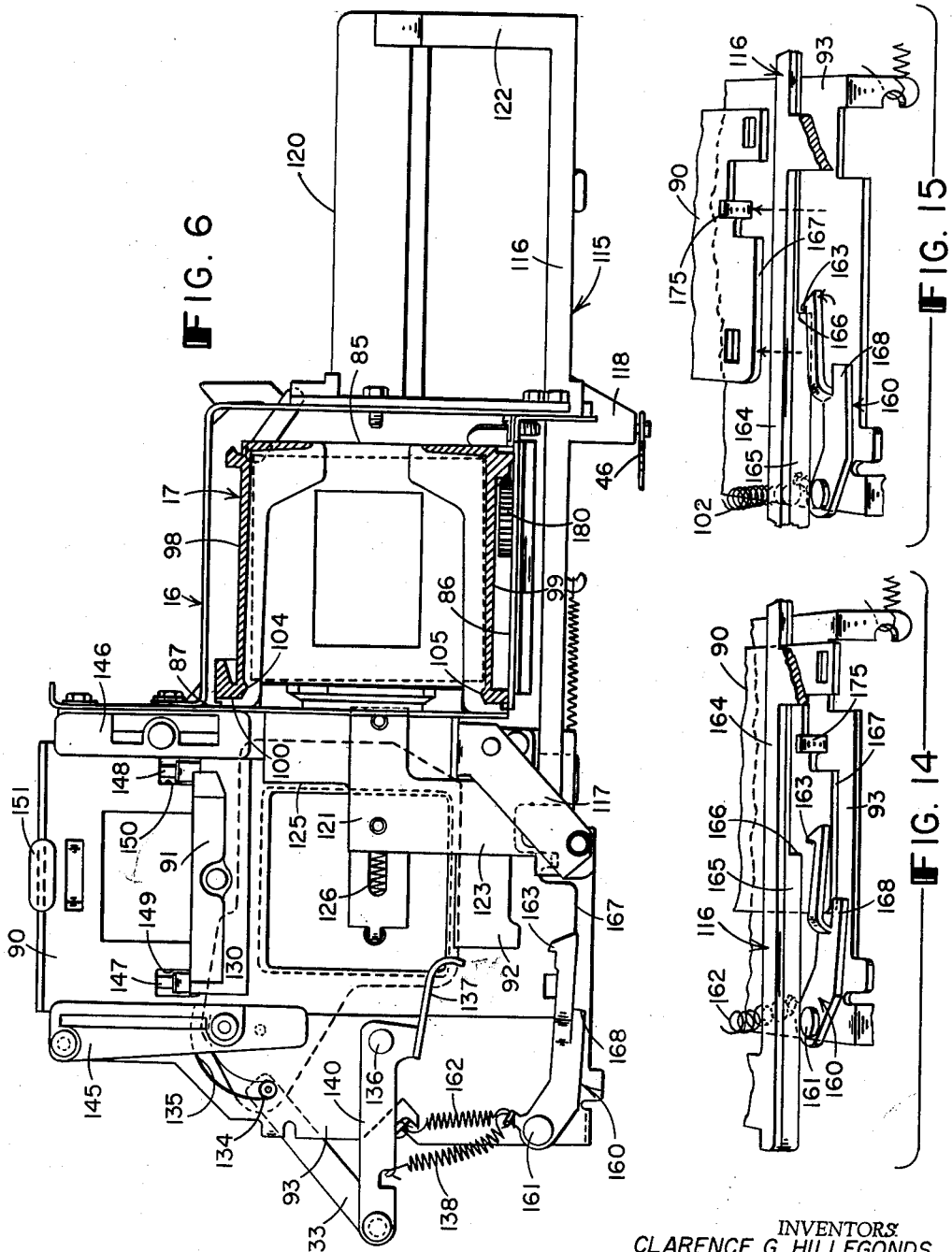

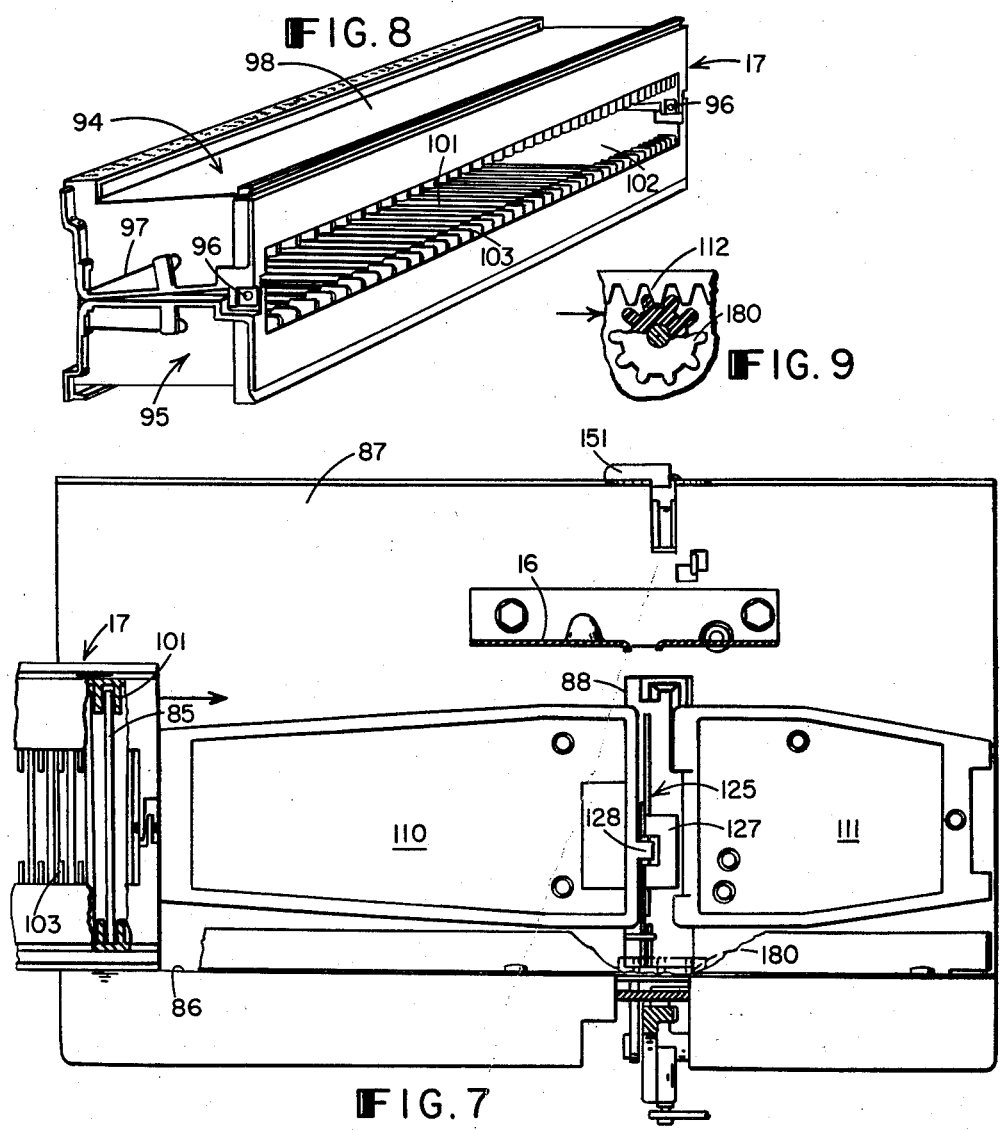

April 27, 1965  C. G. HILLEGONDS ETAL  3,180,212
SLIDE PROJECTOR WITH MOVABLE GATE FOR EDITING PURPOSES
Filed Nov. 6, 1961  7 Sheets-Sheet 6

INVENTORS.
CLARENCE G. HILLEGONDS
and WILLIAM BRUCE PESTER
BY
David M. Keay
AGENT.

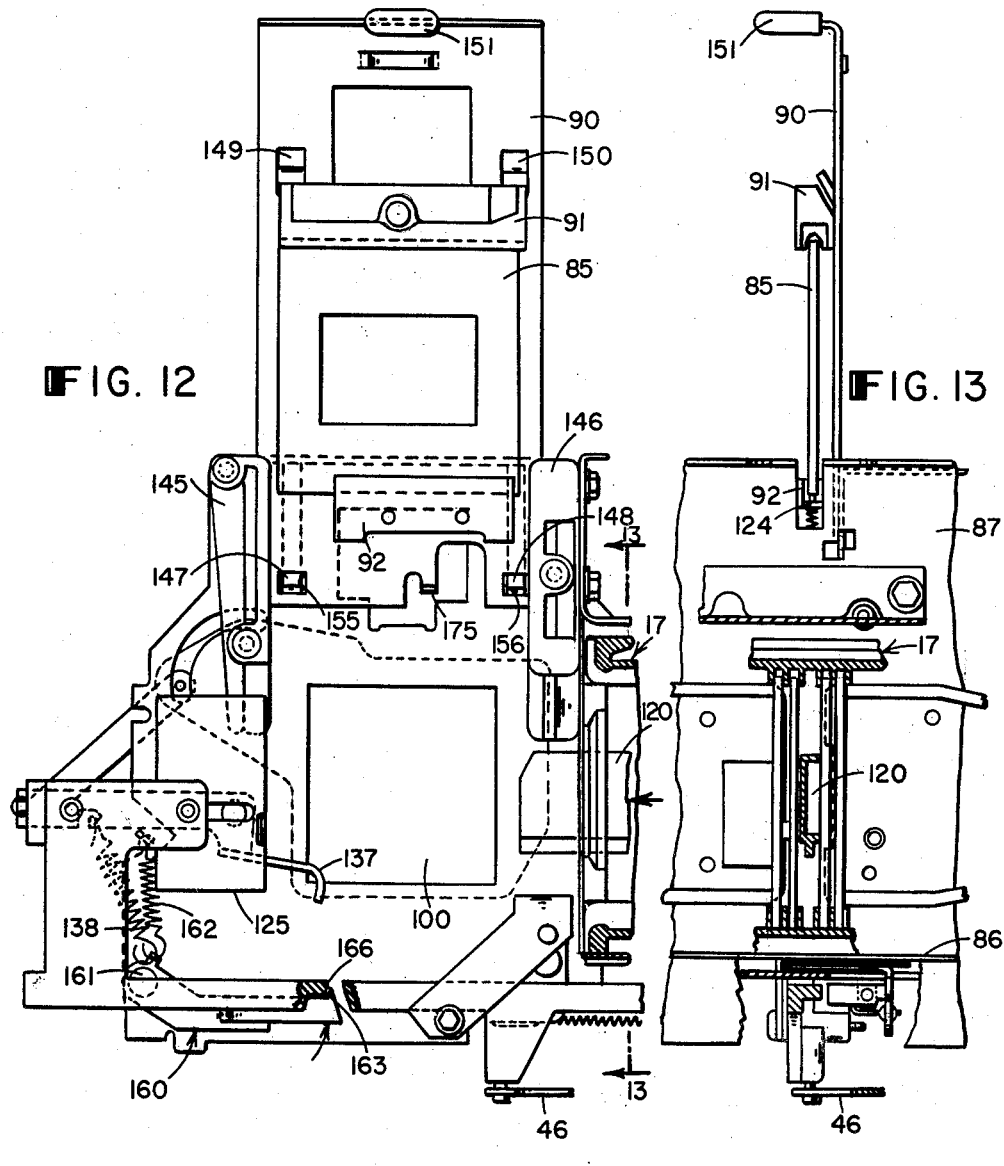

United States Patent Office 3,180,212
Patented Apr. 27, 1965

3,180,212
SLIDE PROJECTOR WITH MOVABLE GATE FOR EDITING PURPOSES
Clarence G. Hillegonds, Ann Arbor, and William Bruce Pester, Ypsilanti, Mich., assignors, by mesne assignments, to Argus Incorporated, a corporation of Delaware
Filed Nov. 6, 1961, Ser. No. 150,407
10 Claims. (Cl. 88—28)

The present invention relates to optical projectors for projecting the image of a transparent slide onto a viewing surface. More particularly, it is concerned with optical slide projectors which are adapted to receive a magazine containing a supply of slides in a predetermined arrangement and to place the slides in projecting position in sequence.

In operating slide projectors of this general type, it is frequently desirable to remove a slide from the projecting position in the optical train of the projector other than by returning the slide directly to the magazine. This situation occurs when it is desired to "edit" the slide in the projecting position, that is, to remove, replace, or reposition the slide. If a means for removing the slide directly from the projecting position for editing is not provided, the slide must be returned to the magazine, the magazine withdrawn from the projector, the slide located and edited, and the magazine reinserted to the desired position in the projector.

Editing arrangements which enable the slide in the projecting position to be made accessible for removal from the projector are provided in some slide projectors. Frequently their operation involves appreciable manual manipulation in order to disengage the slide from the slide changing mechanism and remove it from the projecting position. In certain projectors employing specialized individual holders in which the slides are mounted the problem of disengaging the holders from the slide changing mechanism may be particularly difficult. It also generally occurs that when the slide is removed from the projecting position for editing, the transmission of light along the optical train is not blocked and an annoying glare of light is projected onto the viewing screen.

It is an object of the present invention, therefore, to provide an improved optical slide projector.

It is a more specific object of the present invention to provide an improved optical slide projector of the type employing a magazine for containing a supply of slides to be viewed in which a slide may be removed directly from the projecting position for editing without being returned to the magazine.

Briefly, in accordance with the foregoing objects of the invention, a slide projector is provided with a gate for supporting a slide in projecting position across the optical train. The gate is moveable from its projecting position to an editing position removed from the optical train at which position the slide may be removed from the gate and be repositioned or replaced as desired. The projector also includes a slide changing mechanism having a slide transfer means which transfers a slide from a supply of slides to the gate and which returns the slide to the supply while the gate is in its projecting position. The slide transfer means is alternately positioned in a slide injection position to place a slide in the gate and in a slide ejection position to return a slide to the supply. After a slide has been returned to the supply, a transport means in the slide changer mechanism causes the supply of slides to index in order to place the next slide in sequence in position to be transferred from the supply to the gate by the slide transfer means.

It is a feature of the invention to employ a gate having slide supporting means mounted thereon for receiving a slide as it is transferred from a magazine containing a supply of slides and for supporting the slide in projecting position across the optical train. The slide transfer means moves the slide horizontally from the magazine into projecting position at the gate. Means are provided for moving the gate including the slide supporting means vertically from the projecting position to the editing position at which the slide is accessible for removal from the projector.

It is also a feature of the invention to provide an interlocking arrangement between the gate and the slide changing mechanism for preventing movement of the gate from the projecting position to the editing position when the slide transfer means is in the slide ejection position.

It is another feature of the invention to provide a second interlocking arrangement between the gate and the slide changing mechanism for preventing movement of the slide transfer means from the slide injection position except when the gate is in the projecting position.

It is an additional feature of the invention to provide a shutter arrangement which is adapted to block the transmission of light along the optical train except when a slide is in projecting position across the optical train.

Additional objects, features, and advantages of slide projectors according to the invention will be apparent from the following detailed discussion an the accompanying drawings wherein:

FIG. 2 is a bottom view of the projector with the bottom and side covers removed to show the chassis or main support plate of the projector;

FIG. 2A is a detailed fragmentary view of a collapsible connecting link in the driving mechanism between the drive motor and the slide transfer carriage of the slide changing mechanism;

FIG. 6 is a view from the rear illustrating the slide changer and projection gate of the projector and showing a slide magazine in cross section in position in the changer, the slide transfer carriage of the slide changing mechanism being shown in the slide ejection position;

FIG. 7 is a side view of a portion of a slide changer showing a slide magazine being inserted into the changer from the rear while the slide transfer carriage is in the slide ejection position;

FIG. 8 is a perspective view of a slide storage magazine which is employed in conjunction with the slide changer;

FIG. 9 is a fragmentary view of the slide magazine from below illustrating the manner in which the slide magazine is engaged by a drive wheel of the magazine transport mechanism;

FIG. 12 is a view from the rear illustrating portions of the slide changer and the projection gate with the gate raised to the editing position;

FIG. 13 is a side view of a portion of the slide changer and projection gate taken generally along the line 13—13 of FIG. 12;

FIG. 14 is a fragmentary perspective view from below illustrating interlock arrangements between the projection gate and the slide transfer carriage when the gate is in the projecting position; and FIG. 15 is a fragmentary perspective view similar to that of FIG. 14 showing the gate slightly raised from the projecting position.

*General description*

Figure 1:
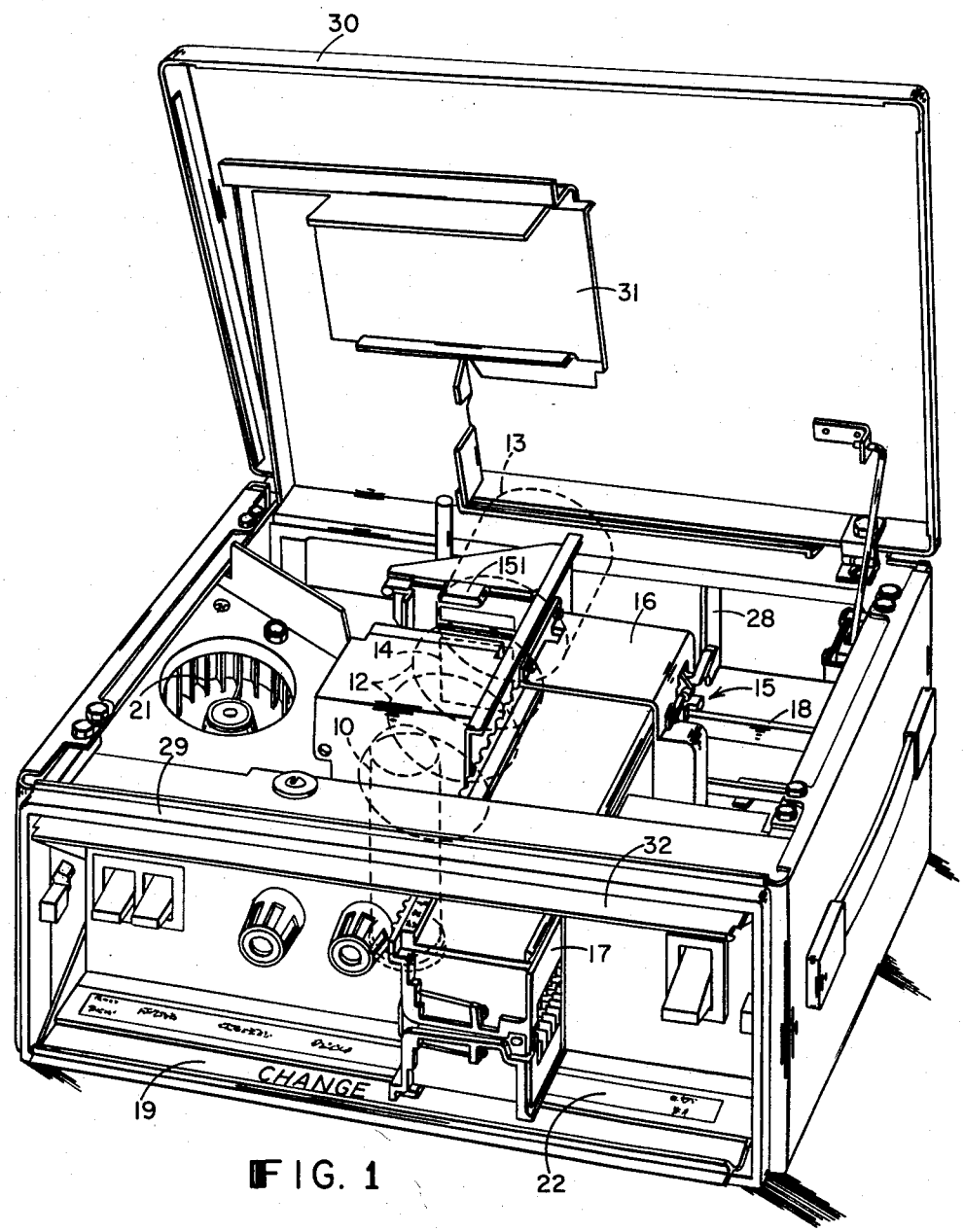
FIG. 1 is a perspective view from the rear, or operator's position, of an optical slide projector according to the invention showing the projector with its top and intermediate covers raised, with the rear doors open, and with a slide magazine inserted in the projector.

The perspective view of the projector in FIG. 1 together with the bottom view of FIG. 2 illustrate the general arrangement of a slide projector according to the invention. The optical train of the projector includes a projection lamp 10 positioned in a socket 11 and a projecting lens system comprising the lenses 12 of the condenser lens assembly and also the objective lens assembly 13. A projection gate 14 in which a slide is positioned for viewing is located across the optical train between the condenser and the objective lens assemblies. A changer 15 for positioning a plurality of slides in sequence in the projection gate is arranged adjacent the gate. The changer includes a tunnel 16 which is adapted to receive a removable magazine 17 containing a supply of slides arranged in individual compartments along the length of the magazine. A slide transfer carriage 18, only a very small portion of which is visible in FIGS. 1 and 2, moves the slide from the magazine compartment located at a transfer station opposite the gate into the gate for viewing, and subsequently returns the slide to the same compartment. The magazine is then shifted by a magazine transport mechanism, located beneath the tunnel, to position the next slide in sequence at the transfer station opposite the gate. The action of replacing a slide in the projection gate with the subsequent slide is accomplished automatically by the slide changing mechanism during a "change" cycle upon actuation of the "change" treadle 19. An electric motor 20 drives the slide changing mechanism and also rotates a blower 21 which circulates cooling air throughout the projector. Electrical power for operating the electric motor 20, the projection lamp 10, and an electroluminescent panel lamp 22 is applied at a connector 23.

The various subassemblies of the projector are mounted directly or indirectly on a base member or chassis 27 which extends across the bottom and along the two sides of the projector. Attached to the chassis are a front casting 28 and a rear casting 29. The objective lens assembly 13 is mounted in an opening in the front casting and is moveable along the direction of the axis of the optical train in order that the projected image may be properly focused and so that the objective lens assembly may be withdrawn into the casting for storage. An opening for permitting slide magazines to be placed in or withdrawn from the magazine tunnel is also provided in the front casting. The rear casting 29 has an opening through which magazines may be inserted into the tunnel, and the projector operating controls are mounted on the rear casting. The top cover 30 of the projector is hinged to the front casting so that it may be raised as shown in FIG. 1. The top cover may be in either the open or closed position while the projector is operating. However, in this embodiment the cover must be open in order for the slide editing arrangement of the projector to be utilized as will be explained hereinafter. An intermediate cover 31, shown open, is also hinged to the front casting. This cover is ordinarily opened only for maintenance, such as for replacing the projection lamp or cleaning the condenser lenses, and it is closed during operation of the projector in order to obtain proper circulation of cooling air throughout the projector.

Self-storing upper and lower rear doors 32 and 19, shown open in FIG. 1 to provide access to the controls and the magazine tunnel, are closed when the projector is not in use. The doors are mounted on the rear casting in a spring-biased, two-position over-center arrangment so that they will remain in either the closed or the open position. Two similar doors are mounted on the front casting and are open during operation of the projector to permit the transmission of light along the optical train to the viewing screen and to permit the objective lens and the magazine to extend forward beyond the front casting.

*Slide changer driving mechanism*

Figure 3:
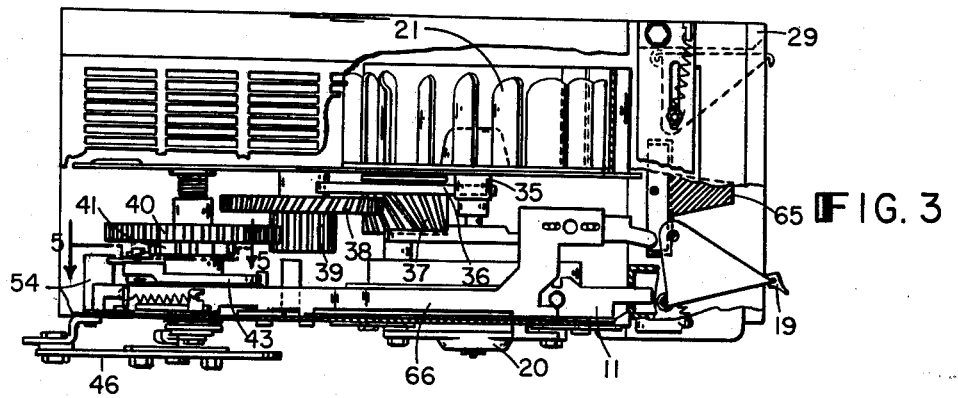
FIG. 3 is a view from the side of the projector with portions removed to show the drive motor, gear train, clutch, and clutch control arrangement for operating the slide changer.
Figure 4:
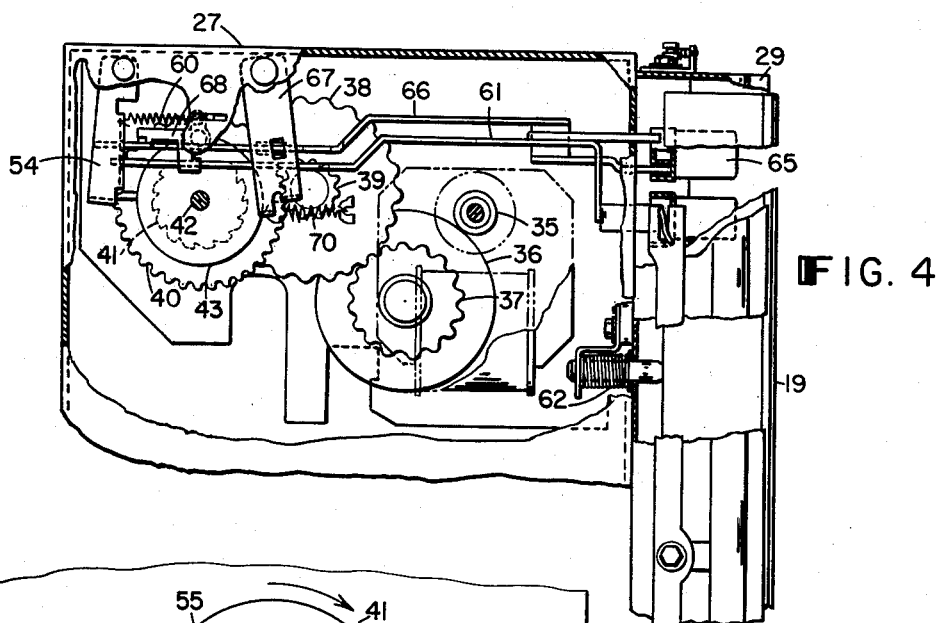
FIG. 4 is a view from the bottom of the projector with portions of the chassis removed in order to show the drive motor, gear train, clutch, and control arrangement.

The slide changing mechanism for moving slides in succession from a magazine to the projection gate and back to the magazine is driven by the electric motor 20 through a gear train, clutch, clutch shaft, and a linkage arrangement which converts the rotary motion of the shaft to reciprocating motion at the slide transfer carriage 18. The gear train and clutch together with the control arrangement for engaging and disengaging the clutch can best be understood by reference to FIGS. 3, 4, and 5.

The shaft of the electric motor 20 is encircled by a rubber sleeve 35 which bears against the side of a metal disc 36 so as to drive the disc. The blower 21 for circulating cooling air is fastened directly to the same shaft. A gear 37 mounted on the disc engages a speed reducing gear 38 which has a pinion 39 meshing with another gear 40. This gear is fastened to a ratchet gear 41 of the clutch and the two gears rotate freely on a clutch shaft 42. A clutch disc 43 is rigidly fastened to the clutch shaft and a crank 44, as best seen in FIG. 2, is fastened to the end of the shaft which extends below the chassis. A collapsible connecting link 45 and cross-arm 46, which can best be seen in FIG. 2 complete the linkage arrangement to the slide transfer carriage.

Figure 5:
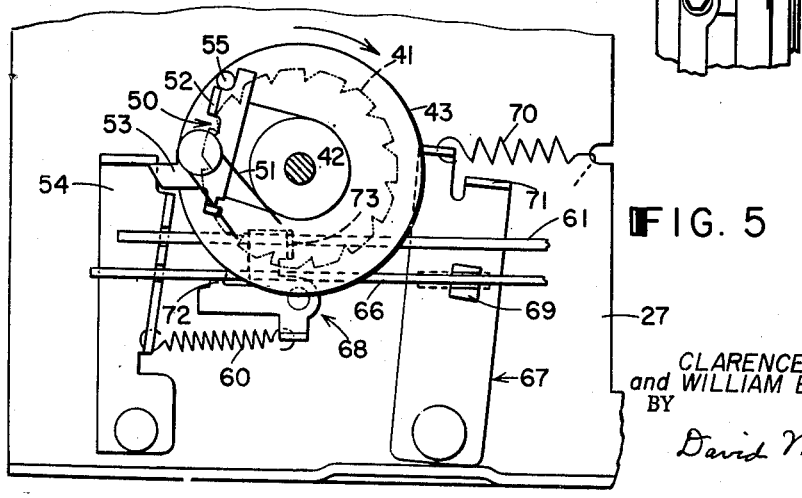
FIG. 5 is a top view of the clutch taken generally along line 5—5 of FIG. 3 and illustrating details of the clutch and the control arrangement associated with it.

The ratchet gear 41 and the clutch disc 43 together with a pawl 50 mounted on the clutch disc provide a clutch which enables the continuously rotating motor to rotate the clutch shaft intermittently, as can be most clearly understood by reference to the detailed view of FIG. 5. An arrangement of stops and control rods permits the operator selectively to engage the clutch so that it is automatically disengaged after the clutch shaft has rotated through one complete revolution or through one half of a revolution to place the crank in either of two predetermined positions.

The connection between the ratchet gear 41, which is the driving member of the clutch, and the clutch disc 43, which is the driven member, is accomplished through the pawl 50 which is pivotally mounted on the disc. The pawl is biased by an eye-spring 51 in a manner tending to urge an ear 52 of the pawl into the path of the continuously rotating ratchet gear. When the pawl is engaged by the ratchet gear, the clutch disc, clutch shaft, and crank rotate with the ratchet gear.

The clutch is disengaged and rotation of the clutch shaft stopped by pivoting the pawl away from the ratchet gear against the action of the eye-spring 51. This pivoting action is accomplished when an arm 53 of the pawl strikes against a stop 54 interposed across the path of rotation of the arm. The rotating motion of the clutch disc and the arm 53 as it strikes the stop causes the pawl to pivot with respect to the disc and release the ear 52 from the teeth of the ratchet gear. The pawl pivots only until a portion of the pawl contacts a boss 55 on the clutch disc. Although the ratchet gear continues to rotate, the clutch disc is positively stopped in a predetermined position as illustrated in FIG. 5.

The stop 54 is pivotally mounted on the chassis and is normally biased by a spring 60 so as to be in position to intercept the arm of the pawl. Thus, the positions of the clutch disc and the shaft are normally as illustrated in FIG. 5. These positions are the so-called "full cycle" positions of the disc and the shaft, and the stop 54 in the full cycle stop. When the disc and shaft are in the full cycle position, the crank 44 is also in the full cycle position which is illustrated in phantom in FIG. 2.

In order that the pawl may engage the ratchet gear to rotate the clutch disc and shaft, the full cycle stop 54 is withdrawn so as to release the arm 53 and permit the eye-spring 51 to pivot the pawl and move the ear 52 into engagement with the rotating ratchet gear. The stop 54 is pivoted to free the pawl by movement of a "change" or "full cycle" control rod 61 in the forward direction toward the front of the projector. The edge of a cutout in the rod engages a portion of the stop so that movement of the rod pushes the stop free of the pawl arm 53.

The "change" control rod 61 is moved forward by depressing the "change" treadle, the lower rear door 19, of the projector beyond its normal open position against the action of a door stop spring 62. The lower inner edge of the door pushes against the control rod and moves it forward. When the treadle is released, the door stop spring 62 returns the treadle to its normal open position. The spring 60 then causes the full cycle stop 54 to return to its normal position in the path of the rotating pawl arm 53 so that the disc and shaft will be stopped in the full cycle position. Thus, momentary actuation of the "change" treadle permits one complete revolution of the clutch disc, shaft, and crank.

When operating the projector, it is also important to be able to rotate the clutch disc and shaft through one-half of a revolution and stop them at a "half cycle" position, 180° from the full cycle position shown in FIG. 5. The half cycle position of the crank is illustrated by the full-line showing in FIG. 2. Rotation of the disc from the full to the half cycle position is initiated by depressing a control button 65 mounted on the rear casting 29. The button pivots, and pushes a half cycle control rod 66 toward the front of the projector. This rod cooperates with the full cycle stop 54, a half cycle stop 67, and a latch 68 so as to permit the clutch to be engaged and then disengaged when the disc has been rotated to the half cycle position.

The half cycle rod has a protrusion which engages the half cycle stop 67 at an opening 69 in the stop. The stop is pivotally mounted on the chassis and is normally biased clear of the clutch disc and pawl by a spring 70. The half cycle control rod is cut away to provide an edge which leans against a portion of the full cycle stop 54 upon forward movement of the half cycle control rod. When the half cycle control rod is pushed forward against the action of the spring 70, the full cycle stop releases the pawl 50 permitting the clutch disc and shaft to rotate. This movement of the half cycle control rod also moves the half cycle stop into position whereby an arm 71 of the stop intercepts the rotating pawl arm and stops the disc, shaft, and crank in the half cycle position.

Both the half and full cycle stops are held in the positions described above by the action of the latch 68 after the half cycle control rod is released. The latch tends to be pivoted about its mounting on the chassis by the spring 60, but it is normally held in the position shown in FIG. 5 by an ear 72 of the latch which bears against the surface of the half cycle control rod. When the half cycle control rod is moved forward, however, the ear drops into a cutout in the rod. Although the half cycle stop spring 70 tends to move the stop and the rod rearward, the edge of the cutout in the rod abuts the ear of the latch and thus movement of the rod and stop is prevented.

In order to release the clutch disc and shaft from the half cycle position and return them to the full cycle position, the full cycle control rod is moved forward by depressing the "change" treadle. The edge of a cutout in the full cycle rod strikes a tab 73 on the latch 68 and pivots the latch sufficiently to move the ear 72 out of the cutout in the half cycle rod. The half cycle stop spring 70 then causes the stop 67 and the half cycle rod to return to their normal rearward positions. The clutch pawl 50 is thereby released from the half cycle stop and is pivoted by the eye-spring 51 so that the ear 52 engages the continuously rotating ratchet gear 41 and the clutch is engaged. The full cycle stop 54 also returns to its normal position under the action of the spring 60 after the half cycle rod has been disengaged from the latch and the "change" treadle is released. The full cycle stop then intercepts the pawl arm and stops the disc, shaft, and crank in the full cycle position.

The linkage arrangement between the intermittently rotating crank 44 and the reciprocating slide transfer carriage 18 of the slide changer is best seen in FIG. 2. The full-line showing in FIG. 2 of the crank and linkage illustrates the positions they assume when the clutch is in the half cycle position. The crank and the end portion of the collapsible connecting link 45 are also shown, in phantom, in the full cycle position.

Pivotally attached to the crank is a rod 75 of the collapsible connecting link 45, details of which are shown in the fragmentary view of FIG. 2A. A slide 76 which is slidable along the length of the rod is normally held in a fixed position with respect to the rod by a detent arrangement. Rollers 77 and 78 which are carried by a spring 79 mounted on the slide are biased toward each other and bear against the edges of the rod. The rollers mate with notches 80 and 81 in the edges of the rod. This detent arrangement normally holds the rod and slide in a fixed relationship as shown in FIGS. 2 and 2A, but any excessive stress between the slide and the rod along the length of the rod forces the rollers out of the notches and the slide and rod slip with respect to each other. Movement of the rod after the stress has been removed permits the rollers to re-enter the notches and re-establish the normal fixed relationship between the rod and slide.

A cross-arm 46 connects the slide of the collapsible connecting link to the slide transfer carriage 18 by pivot connections to the carriage and the slide and a pin and slot connection 82 to the chassis. The linkage arrangement thereby converts the rotary motion of the shaft and crank to reciprocating motion at the slide transfer carriage 18, and the collapsible connecting link 45 isolates the shaft and carriage from each other thus preventing damage in the event of a jam or other stress occurring in the driving mechanism.

*Slide changer and projection gate—General description*

Figure 10:
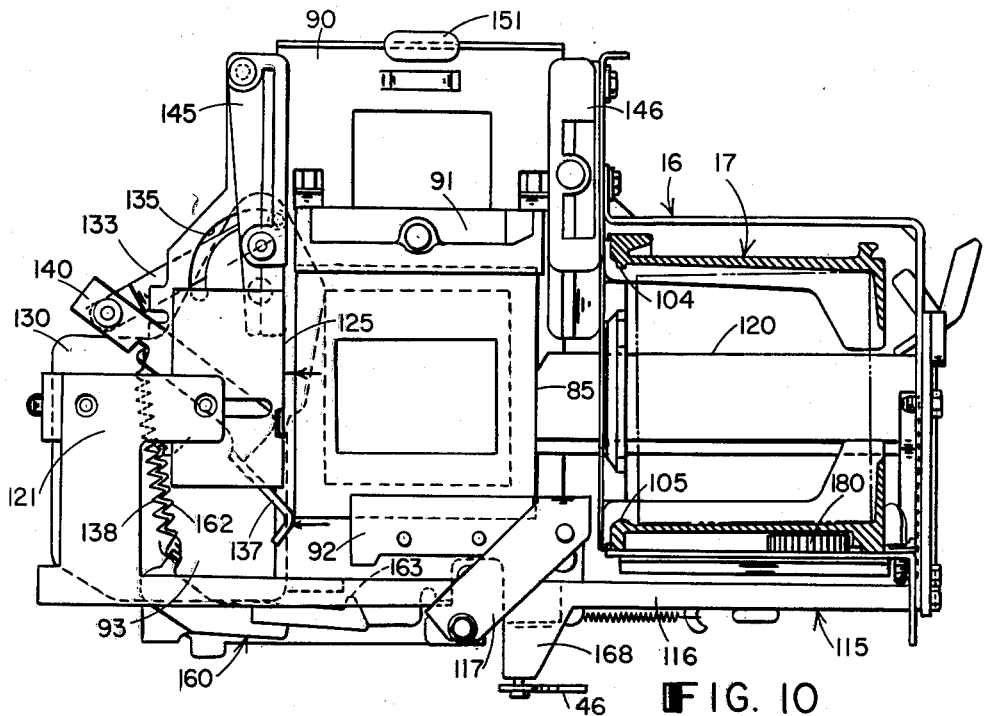
FIG. 10 is a view similar to that of FIG. 6 showing the slide transfer carriage in the slide injection position and a slide in position in the projection gate.

The slide projection gate 14 and slide changer 15 are illustrated in FIGS. 6, 7, and 10 until certain portions being shown in greater detail in other figures. The slide changer is driven by the motor through the gear train, clutch, and linkage arrangement successively to place the slides stored in a magazine in the projection gate for viewing. The changer includes a tunnel 16 which is adapted to receive a slide magazine 17 containing a supply of slides 85 to be viewed. The tunnel has a floor 86 which extends the full length of the projector between the openings in the front and rear castings. A side wall 87 which separates the magazine tunnel from the optical train similarly extends the length of the projector. An opening 88 in the side wall opposite the gate, which is best shown in FIG. 7 permits slides to be moved from a magazine in the tunnel to the projection gate and back to the magazine by the slide transfer carriage 18.

The projection gate itself is comprised of an apertured plate 90 having upper and lower slide supports 91 and 92 for holding a slide. The aperture in the gate is aligned with an aperture in a gate support plate 93. The plate is attached to the side wall and both apertures lie along the optical train. The aperture in the support plate is blocked by a shutter in order to prevent the transmission of light along the optical train except when a slide is in projecting position in the gate.

Slide Magazine

A storage magazine 17 for holding a supply of transparent slides is comprised of two generally similar body members 94 and 95 which are pivotally connected together as by means of a rivet 96 at each end as can best be seen in the perspective view of FIG. 8. Springs 97 mounted on the two members at each end of the magazine tend to bias the body members toward each other about the pivot connections. The magazine has a solid top 98 and bottom 99, as viewed when in position in the tunnel, and an open side 100 through which slides are introduced and withdrawn, as can be seen from the cross section views of the magazine in FIGS. 6 and 10. The interior of the magazine is divided transversely into a plurality of slide compartments by partitions 101 which are integral with each body member and extend toward each other from the top and the bottom. The side of the magazine opposite the open side has an opening 102 along its length into which portions of the partitions 103 extend. Longitudinal ridges 104 and 105 along the body members at the open side of the magazine serve to block the open side sufficiently to prevent slides from inadvertently dropping from the magazine except when the size of the opening is increased by pivoting the body members in opposition to the springs 97.

In order to enlarge the opening along the open side of the magazine sufficiently for slides to be withdrawn and reinserted by the slide transfer carriage while the magazine is in the changer, magazine opening cams 110 and 111 are located on the side wall 87 of the tunnel as illustrated in FIG. 7. The upper and lower surfaces of the cams diverge in the vicinity of the side wall opening so that as a magazine is inserted into the tunnel, from either the rear or the front, the body members are pivoted open by the cam surfaces sufficiently to permit the movement of slides through the open side. The magazine also has a rack gear 112 of one tooth per slide compartment along the inside of the bottom edge as can best be seen in FIG. 9, for engagement with a rotating portion of a magazine transport mechanism.

More complete details concerning the magazine and its manner of cooperating with the slide changer may be had by reference to application, Serial No. 150,482 entitled "Projector and Transparent Slide Storage Magazine Therefor," filed Nov. 6, 1961, by Jacob D. Danner and assigned to the assignee of the present invention.

Slide transfer carriage

The slide transfer carriage 18 of the changer transfers the slides 85 between the magazine compartments and the projection gate through the opening 88 in the tunnel side wall. The entire carriage is reciprocated from the slide ejection position shown in FIG. 6 to the slide injection position shown in FIG. 10 by the slide changer driving mechanism. The linkage arrangement of the driving mechanism places the carriage in the slide ejection position when the clutch and crank are in the half cycle position and places the carriage in the slide injection position when the clutch and crank are in the full cycle position.

The body of the carriage is a yoke 115 having a horizontal bar 116 disposed transversely of the optical train and lying below the tunnel and the aperture of the gate. The bar is slidably mounted for transverse movement in a guide 117 attached to the gate support plate 93. A boss 118 on the bottom of the bar 116 is pivotally connected to the cross-arm 46 of the driving mechanism so that the carriage may be reciprocally driven. An injector arm 120 and an ejector arm 121 extend toward each other from vertical supports 122 and 123 at opposite ends of the bar. The inner edge of the injector arm is adapted to fit into the compartment of a magazine and to push the slide from the compartment, through the opening 88 in the side wall of the tunnel, and into the slide supports 91 and 92 of the gate. The entrances to the supports are appropriately flared to receive a slide and the bottom support 92 contains a spring loaded pad 124, as can be seen in FIGURE 13. The slide is thus readily pushed into the gate and is positioned firmly for proper projection.

The ejector arm 121 carries an ejector plate 125 which is biased toward the injector arm by a spring 126. When the yoke is moved from the slide injection position of FIG. 10 toward the slide injection position of FIG. 6 a portion 127 of the ejector plate disposed transversely to the direction of movement of the carriage pushes the slide out of the gate and back into its magazine compartment. As the ejector plate reaches the tunnel side wall, as illustrated in FIG. 7, it strikes a stop 128 and its further movement is prevented while the yoke continues to move. In this position the ejector plate returns the slide to its compartment and the transverse portion lies athwart the opening 88 in the sidewall so as to block the opening.

Shutter

As a slide is moved from the magazine to the projection gate the last portion of that movement causes the normally closed shutter 130 to open. The shutter is pivotally connected by a pin 131 to the front of the gate support plate 93 as can best be seen in FIG. 11. A point on an arm 132 of the shutter is pivoted at the end of a connecting link 133, and the pivot connection 134 tends to move along an arcuate slot 135 in the gate support plate, the center of the arc being the pivot point 131 of the shutter. A trigger arm 140, as best seen in FIG. 6, is pivoted on the back of the gate support plate at 136. A trigger cam 137 at one end of the trigger arm extends into the region occupied by a slide when the slide is in the projecting position across the optical train. The other end of the trigger arm is pivotally connected to the connecting link 133. A shutter spring 138 biases the trigger arm in a counterclockwise direction about its pivot point 136 as seen from the rear, FIG. 6. This action tends to hold the pivot connection 134 between the shutter arm and the link 133 at the bottom of the arcuate slot 135, thus holding the shutter in its closed position blocking the path of light from the lamp through the gate.

Figure 11:
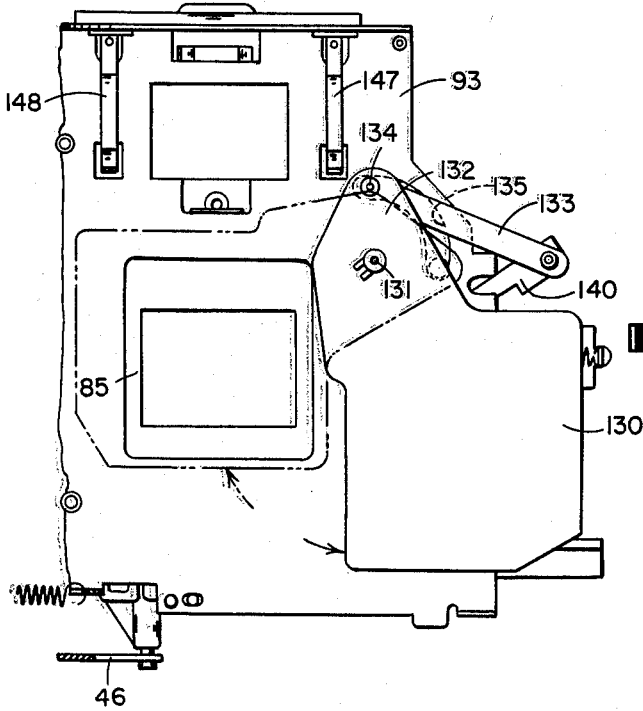
FIG. 11 is a fragmentary view of the slide projection gate from the front of the projector illustrating the shutter for blocking the transmission of light along the optical train.

As can be seen from FIG. 10, when a slide is moved into projecting position in the gate, the slide itself contacts the side surface of the cam 137 of the trigger arm 140. Continued movement of the slide displaces the cam downward and along the direction of movement of the slide thus pivoting the trigger arm in a clockwise direction, as seen in FIG. 10, against the action of the shutter spring 138. Through the connecting link 133 the pivot connection 134 of the link to the shutter is moved to the upper end of the arcuate slot 135 thus pivoting the shutter to its open position as shown in FIG. 11.

When the slide transfer carriage moves from the slide injection position of FIG. 10 toward the slide ejection position of FIG. 6, the ejector plate 125 pushes the slide out of projecting position as explained hereinabove. The first portion of this motion moves the slide clear of the trigger cam and permits the trigger arm to pivot under the action of the shutter spring. The shutter linkage thereby closes the shutter blocking the transmission of light along the optical train until the next slide is moved into projecting position and displaces the cam.

Slide editor

The slide editing feature of the projector is achieved by making the entire gate, including the slide supports 91 and 92, moveable from its projecting position across the optical train. The gate includes a flat apertured plate 90 which fits slidably between two vertical guides 145 and 146 and the gate support plate 93 on which the guides are mounted. A pair of detent springs 147 and 148 which are mounted on the front of the gate support plate, as shown in FIG. 8, engage openings 149 and 150 in the gate and serve to hold the gate firmly in its lowermost or projecting position as shown in FIGS. 6 and 10. The gate is manually raised to its editing position by the operator through the medium of a handle 151 at the top of the plate. As can be seen in FIG. 1, the handle is readily accessible when the top cover 30 of the projector is raised.

As the projection gate is raised, the slide 85 is carried from the projecting position, permitting the trigger cam 137 of the shutter mechanism to move upward under the action of the shutter spring 138. The shutter is thereby closed blocking the transmission of light along the optical train in the same manner as when a slide is removed from the projecting position by the slide transfer carriage. As the gate is raised to the editing position as illustrated in FIGS. 12 and 13, the detent springs 147 and 148 protrude into a second set of openings 155 and 156 in the gate and hold the gate firmly in position. With the gate in this position, the slide is readily accessible to the operator for removal and for replacement or repositioning.

After completion of an editing operation, the gate handle 151 is pushed downward until the detent springs snap into the openings 149 and 150 in the gate, thus positioning the gate and slide in the projecting position as shown in FIG. 10. During the last portion of the downward movement, the slide itself contacts the shutter trigger cam 137 at its upper surface pivoting the trigger arm against the bias of the shutter spring 138 and opening the shutter.

Editor-carriage interlocks

In order to prevent the slide transfer carriage from leaving the slide injection position while the gate is in the editing position, an interlocking arrangement is provided between the gate and the carriage. An interlock is desirable to eliminate the possibility of the slide changer mechanism operating either by inadvertent actuation of the controls or by automatic operation if a timing mechanism is employed. Operation of the changer would drop the next slide from the magazine into the space from which the gate had been moved with possible jamming of the projector and damage to the slide, particularly when the gate is subsequently returned to the projecting position.

The function of the interlock can best be understood from FIGS. 14 and 15, which show a fragment of the rear of the changer viewed generally from below, taken in conjunction with FIGS. 6, 10, and 12. The interlock or latch 160 is pivotally mounted at one end on the rear of the gate support plate 93 at 161, and a spring 162 tends to pivot the interlock upward. An upward extending catch 163 is located at the end of the interlock opposite the pivot. The horizontal bar 116 of the slide transfer carriage is generally angular in cross section having a vertical member 164 which extends along its entire length and also having a horizontal member 165. A portion of the horizontal member is removed to provide an edge 166 as best seen in FIGS. 14 and 15.

When the gate is in its projecting position as shown in FIG. 14, the lower edge 167 of the gate contacts an arm 168 on the interlock and holds the interlock down against the bias of the spring 162. With the interlock displaced to this position by the gate the top of the interlock catch lies below the horizontal member 165 of the bar, and the carriage can reciprocate freely with no interference from the interlock.

When the gate is raised, however, as illustrated in FIGS. 12 and 15, the interlock pivots upward, and the catch 163 extends above the level of the edge 166 of the horizontal member. If the clutch becomes engaged while the gate is raised, the slide transfer carriage starts to move but the edge 166 of the horizontal member 165 of the bar is stopped by the catch 163. In this event the collapsible connecting link 45 functions as explained hereinabove so that the clutch shaft, and crank can operate in their normal manner without moving the slide transfer carriage and without undue stress being placed on any parts of the projector.

A second interlock between the gate and the slide transfer carriage is also provided in order to prevent the gate from being raised to the editing position while the slide transfer carriage is in the slide ejection position. A hook 175 which extends rearward from the bottom edge of the gate normally lies below the level of the horizontal member 165 of the horizontal bar 116. The horizontal bar is thus free to move laterally with no interference from the hook.

When the slide transfer carriage is in the slide injection position as shown in FIG. 14, the horizontal member of the horizontal bar does not overlie the hook, and the gate may be raised and lowered with no interference between the hook and the bar. When the slide transfer carriage is in the slide ejection position, the horizontal member 165 of the bar overlies the hook. Therefore, with the carriage in this position the gate cannot be raised, and the possibility of causing damage to the projector or slides by raising the gate from the projecting position at an improper time during an operating cycle is eliminated.

Magazine transport mechanism

After a slide has been returned from the gate to its magazine compartment by the slide transfer carriage, the slide magazine 17 is advanced toward the front of the projector a distance equal to the length of one slide compartment by a magazine transport mechanism in order to place the next slide in sequence in the slide transfer station opposite the gate. The magazine 17 has a rack gear 112, one gear tooth for each slide compartment, along the inside of its bottom edge as shown in FIG. 9. The rack teeth are engaged by the gear teeth of an indexing drive wheel 180 which protrudes through the floor 86 of the tunnel, as illustrated in FIGS. 6 and 10. The indexing wheel is rotated through an angle equal to the angle between its gear teeth to cause the magazine to move the length of one compartment.

The magazine transport mechanism is actuated to rotate the indexing wheel by the final movement of the slide transfer carriage into the slide ejection position. Movement of the magazine does not occur until after the ejector plate has pushed the slide from the gate and completely returned it to its compartment, and the injector arm has moved clear of the magazine. The return movement of the slide transfer carriage to the slide injection position then moves the slide newly arrived at the transfer station from its compartment and carries it into the projection gate.

More complete details concerning the magazine transport mechanism may be had by reference to application, Serial No. 150,296, entitled, "Projector" filed November 6, 1961, by Jacob D. Danner and assigned to the assignee of the present invention.

What is claimed is:

1. In a slide projector having an optical train for projecting an image of a transparent slide, the combination including a gate for supporting a slide, means for supporting said gate for movement between a first position where the slide supported by the gate is opposite the optical train in a projection position and in a second position where the slide in the gate can be manually removed from the gate and a slide manually inserted into the gate, means for moving said gate between said first and second positions, and transfer means for moving a slide from a supply of slides to the gate and for returning the slide from the gate to the supply when the gate is in said first position.

2. In a slide projector having an optical train for projecting an image of a transparent slide, the combination including a gate for supporting a slide, means for supporting said gate for movement between a first position where the slide supported by the gate is opposite the optical train in a projection position and in a second position where the slide in the gate can be manually removed from the gate and a slide manually inserted into the gate, means for moving said gate between said first and second positions, transfer means for moving a slide from a supply of slides to the gate and for returning the slide from the gate to the supply when the gate is in said first position, actuating means for alternately positioning said transfer means in a first position to place a slide in said gate and in a second position to return a slide to the supply, and means for moving said gate to a second position removed from said optical train while said transfer means is in said first position.

3. In a slide projector having an optical train for projecting an image of a transparent slide, the combination including a gate for supporting a slide, means for supporting said gate for movement between a first position where the slide supported by the gate is opposite the optical train in a projection position and in a second position where the slide in the gate can be manually removed from the gate and a slide manually inserted into the gate, means for moving said gate between said first and second positions, transfer means for moving a slide from a supply of slides to the gate and for returning the slide from the gate to the supply both when the gate is in said first position, actuating means for alternately positioning said transfer means in a first position to place a slide in said gate and in a second position to return a slide to the supply, and locking means for preventing movement of said gate from said first position to said second position except when said transfer means is in said first position.

4. In a slide projector having an optical train for projecting an image of a transparent slide, the combination including a gate for supporting a slide, means for supporting said gate for movement between a first position where the slide supported by the gate is opposite the optical train in a projection position and in a second position where the slide in the gate can be manually removed from the gate and a slide manually inserted into the gate, means for moving said gate between said first and second positions, transfer means for moving a slide from a supply of slides to the gate and for returning a slide from the gate to the supply both when the gate is in said first position, actuating means for alternately positioning said transfer means in a first position to place a slide in said gate and in a second position to return a slide to the supply, and locking means for preventing movement of said gate from said first to said second position when said transfer means is in said second position and for preventing movement of said transfer means from said first to said second position except when said gate is in said first position.

5. In a slide projector having an optical train for projecting an image of a transparent slide, the combination including a gate for supporting a slide, a gate support for holding said gate in projecting position across the optical train, editing means for moving said gate vertically from the projecting position to an editing position removed from the optical train where the slide in the gate can be manually removed from the gate and a slide manually inserted into the gate, slide transfer means for moving a slide from a slide magazine horizontally into projecting position in the gate and for returning the slide from the gate to the magazine both when the gate is in projecting position, actuating means for alternately positioning said slide transfer means in a slide injection position to place a slide in said gate and in a slide ejection position to return a slide to the magazine, a first locking means for preventing movement of the gate from the projecting position to the editing position when the slide transfer means is in the slide ejection position, and a second locking means for preventing movement of the slide transfer means from the slide injection position to the slide ejection position except when the gate is in the projecting position.

6. In a slide projector having an optical train for projecting an image of a transparent slide, the combination including a gate for supporting a slide, a gate support means for holding said gate in projecting position across the optical train, editing means for moving said gate vertically upward from the projecting position to an editing position above the optical train where the slide in the gate can be manually removed from the gate and a slide manually inserted into the gate, a slide transfer carriage for moving a slide from a slide magazine horizontally into projecting position in the gate and for returning the slide from the gate to the magazine while the gate is in projecting position, actuating means for alternately positioning said slide transfer carriage in a slide injection position to place a slide in said gate and in a slide ejection position to return a slide to the magazine, one element of a first interlock means on said gate, a second element of said first interlock means on said carriage engageable with said one element when said carriage is in the slide ejection position to prevent vertical movement of said gate from the projecting position to the editing position, and a latching element of a second interlock means resiliently mounted on the gate support means to engage the second element of the first interlock means to prevent movement of the carriage from the slide injection position to the slide ejection position while the gate is in the editing position.

7. In a slide projector having an optical train for projecting an image of a transparent slide, the combination including a gate for supporting a slide, a gate support means for holding said gate in projecting position across the optical train, editing means for moving said gate vertically upward from the projecting position to an editing position above the optical train where the slide in the gate can be manually removed from the gate and a slide manually inserted into the gate, a slide transfer carriage for moving a slide from a slide magazine horizontally into projecting position in the gate and for returning the slide from the gate to the magazine while the gate is in projecting position, actuating means for alternately positioning said slide transfer carriage in a slide injection position to place a slide in said gate and in a slide ejection position to return a slide to the magazine, a first element of a first interlock means on said gate, a second element of said first interlock means on said carriage, said second element lying interposed above said first element while the carriage is in the slide ejection position to prevent vertical movement of said gate from the projecting position to the editing position, a latching element of a second interlock means resiliently mounted on the gate support means to engage the second element of the first interlock means while the carriage is in the slide injection position and prevent movement of the carriage to the slide ejection position, said latching element also being engageable by said gate in its projecting position for displacement out of engagement with said second element of the first interlock means whereby the carriage may be moved from the slide injection to the slide ejection position.

8. In a slide projector having an optical train for projecting an image of a transparent slide, the combination including a gate for supporting a slide, means for supporting said gate for movement between a first position where the slide supported by the gate is opposite the optical train in a projection position and in a second position where the slide in the gate can be manually removed from the gate and a slide manually inserted into the gate, means for moving said gate between said first and second positions, transfer means for moving a slide from a supply of slides to the gate and for returning the slide from the gate to the supply when the gate is in the first position, a shutter adapted to be placed across said optical train to prevent the transmission of light therealong, and shutter triggering means adapted to open said shutter and permit the transmission of light along said optical train only while a slide is in the gate and the gate is in said first position.

9. In a slide projector having an optical train for projecting an image of a transparent slide, the combination including a gate for supporting a slide, a gate support for holding said gate in projecting position across the optical train, editing means for moving said gate vertically from the projecting position to an editing position removed from the optical train where the slide in the gate can be manually removed from the gate and a slide manually inserted into the gate and for returning the gate to projecting position, slide injection means for moving a slide from a slide magazine horizontally into projecting position in the gate, slide ejection means for returning a slide from the gate to the magazine, a shutter adapted normally to be placed across said optical train to prevent the transmission of light therealong, and shutter actuating means having a portion adapted to cooperate with a slide in projecting position in the gate when the gate is in projecting position to maintain the shutter in open position.

10. In a slide projector having an optical train for projecting an image of a transparent slide, the combination including a gate for supporting a slide, a gate support for holding said gate in projecting position across the optical train, editing means for moving said gate and a slide in said gate along a vertical path from the projecting position to an editing position above the optical train where the slide in the gate can be manually removed from the gate and a slide manually inserted into the gate and for moving the gate and a slide in the gate along the vertical path from the editing position to the projecting position, a slide transfer carriage for moving a slide along a horizontal path from a slide magazine into projecting position in the gate while the gate is in projecting position and for returning the slide to the magazine along the horizontal path, actuating means for alternately positioning said slide transfer carriage in a slide injection position to place a slide in said gate and in a slide ejection position to return a slide to the magazine, a shutter adapted to be placed across the optical train to prevent the transmission of light therealong, shutter closing means for normally biasing the shutter in the closed position across the optical train, and shutter opening means having a portion extending into both the vertical and horizontal paths of movement of a slide and adapted to be displaced to actuate the shutter opening means by the movement of a slide into projecting position across the optical train.

References Cited in the file of this patent
UNITED STATES PATENTS

| | | |
|---|---|---|
| 2,949,814 | Boughton et al. | Aug. 23, 1960 |
| 2,978,823 | Wiklund | Apr. 11, 1961 |
| 2,986,070 | Lacoe | May 30, 1961 |